United States Patent
Johno (10) Patent No.: US 10,718,938 B2
(45) Date of Patent: Jul. 21, 2020

(54) OPTICAL SCANNING DEVICE, IMAGE DISPLAY DEVICE, HEADS-UP DISPLAY, AND MOBILE OBJECT

(71) Applicant: Ricoh Company, Ltd., Tokyo (JP)

(72) Inventor: Hiroshi Johno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/270,644

(22) Filed: Feb. 8, 2019

(65) Prior Publication Data

US 2019/0285872 A1    Sep. 19, 2019

(30) Foreign Application Priority Data

Mar. 13, 2018  (JP) .................................. 2018-045526

(51) Int. Cl.
*G02B 26/02* (2006.01)
*B60K 35/00* (2006.01)
(Continued)

(52) U.S. Cl.
CPC ............ *G02B 26/023* (2013.01); *B60K 35/00* (2013.01); *G02B 7/005* (2013.01); *G02B 7/006* (2013.01);
(Continued)

(58) Field of Classification Search
CPC ...... G02B 26/023; G02B 7/005; G02B 7/006; G02B 27/0101; G02B 2027/0118;
(Continued)

(56) References Cited

U.S. PATENT DOCUMENTS 3,909,609 A    9/1975   Kidd et al.
5,633,691 A    5/1997   Vogeley et al.
(Continued)

FOREIGN PATENT DOCUMENTS

JP    2006-192574 A    7/2006
JP    2015-049266      3/2015
(Continued)

OTHER PUBLICATIONS

Extended Search Report issued in European Application 19154856.9-1020 dated Aug. 5, 2019.

*Primary Examiner* — Carolyn R Edwards
(74) *Attorney, Agent, or Firm* — Xsensus LLP (57) ABSTRACT

An optical scanning device, an image display device, a heads-up display, and a mobile object. The optical scanning device includes a light source configured to emit scanning light, a light quantity adjuster provided with a plurality of optical attenuators having different light transmittances, the light quantity adjuster configured to change a light-intensity of the scanning light by switching one of the plurality of optical attenuators placed on an optical path, by movement of the light quantity adjuster, to scan a to-be-scanned surface using the scanning light passed through the light quantity adjuster, and a home position sensor configured to detect that the light quantity adjuster is present at a predetermined position. The light source starts emitting the scanning light after one of the plurality of optical attenuators is placed on the optical path at a time of startup.

16 Claims, 8 Drawing Sheets (51) Int. Cl.
  *G02B 27/01* (2006.01)
  *G02B 7/00* (2006.01)
  *G01C 21/36* (2006.01)
(52) U.S. Cl.
  CPC .... *G02B 27/0101* (2013.01); *B60K 2370/334* (2019.05); *G01C 21/365* (2013.01); *G02B 2027/0114* (2013.01); *G02B 2027/0118* (2013.01)
(58) Field of Classification Search
  CPC ............ G02B 2027/0114; B60K 35/00; B60K 2370/334; G01C 21/365
  See application file for complete search history.

(56) References Cited

U.S. PATENT DOCUMENTS

| | | | |
|---|---|---|---|
| 2007/0013965 A1 | 1/2007 | Iwanaga | |
| 2014/0268174 A1* | 9/2014 | Sabry | B81B 5/00 356/519 |
| 2015/0062345 A1* | 3/2015 | Kusanagi | G02B 27/0149 348/162 |
| 2016/0334637 A1 | 11/2016 | Saisho et al. | |
| 2018/0070062 A1 | 3/2018 | Shitomi | |
| 2018/0252916 A1 | 9/2018 | Nakamura et al. | |
| 2019/0122635 A1 | 4/2019 | Kimura | |

FOREIGN PATENT DOCUMENTS

| | | | |
|---|---|---|---|
| JP | 2017-156547 A | | 9/2017 |
| JP | 2017156547 A | * | 9/2017 |
| JP | 2017-194623 A | | 10/2017 |

\* cited by examiner

OPTICAL SCANNING DEVICE, IMAGE DISPLAY DEVICE, HEADS-UP DISPLAY, AND MOBILE OBJECT

CROSS-REFERENCE TO RELATED APPLICATION

This patent application is based on and claims priority pursuant to 35 U.S.C. § 119(a) to Japanese Patent Application No. 2018-045526, filed on Mar. 13, 2018, in the Japan Patent Office, the entire disclosure of which is hereby incorporated by reference herein.

BACKGROUND

Technical Field

The present disclosure relates to an optical scanning device, an image display device, a heads-up display, and a mobile object.

Background Art

There has been conventionally known an optical scanning device that includes a light source and a light quantity adjuster that changes the light intensity of scanning light by switching, among a plurality of optical attenuators having different light transmittances, an optical attenuator to be placed on an optical path by the movement of the light quantity adjuster. The optical scanning device optically scans a to-be-scanned surface using light that is emitted from the light source and passes through the light quantity adjuster.

For example, the heads-up display described in Patent Literature 1 moves a polarizing member including five optical attenuators with different light transmittances by an actuator to switch an optical attenuator to be placed on an optical path, thus adjusting the light-intensity of scanning light during scanning.

SUMMARY

Embodiments of the present disclosure described herein provide an optical scanning device, an image display device, a heads-up display, and a mobile object. The optical scanning device includes a light source configured to emit scanning light, a light quantity adjuster provided with a plurality of optical attenuators having different light transmittances, the light quantity adjuster configured to change a light-intensity of the scanning light by switching one of the plurality of optical attenuators placed on an optical path, by movement of the light quantity adjuster, to scan a to-be-scanned surface using the scanning light passed through the light quantity adjuster, and a home position sensor configured to detect that the light quantity adjuster is present at a predetermined position. The light source starts emitting the scanning light after one of the plurality of optical attenuators is placed on the optical path at a time of startup. The image display device includes the optical scanning, and the optical scanning device optically scans a to-be-scanned surface to display an image on the to-be-scanned surface. The heads-up display includes the optical scanning device, and the optical scanning device optically scans a to-be-scanned surface to display an image on the to-be-scanned surface. The mobile object includes the image or the heads-up display.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, an embodiment of an optical scanning device, an automobile heads-up display (hereinafter referred to as HUD) serving as an image display device, and an automobile serving as a mobile object, to which the present disclosure is applied, will be described. The application scope of the present disclosure is not limited to the embodiment described below. The present disclosure may be used as an optical scanning device of an image display device that is incorporated in a mobile object such as a vehicle, a vessel, an aircraft, and a mobile robot or an immobile object such as a working robot that operates a drive target such as a manipulator without moving from an installed position.

A basic configuration of an automobile or the like according to the embodiment will be described first.

Figure 1:
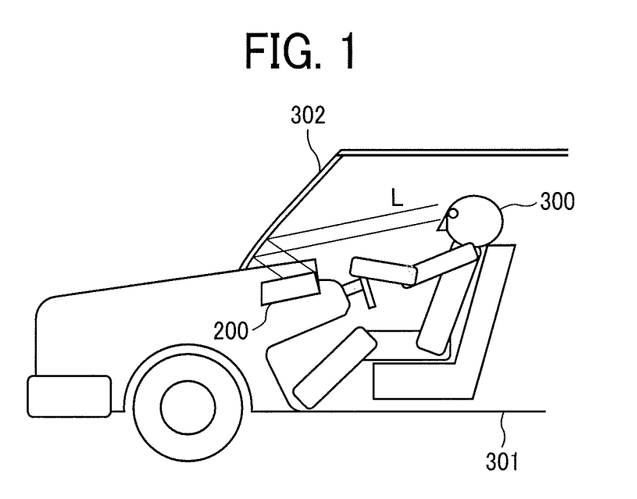
FIG. 1 is a schematic view schematically illustrating a configuration of an automobile in which an automobile HUD according to an embodiment is incorporated.

FIG. 1 is a schematic view schematically illustrating a configuration of an automobile in which an automobile HUD according to the embodiment is incorporated.

Figure 2:
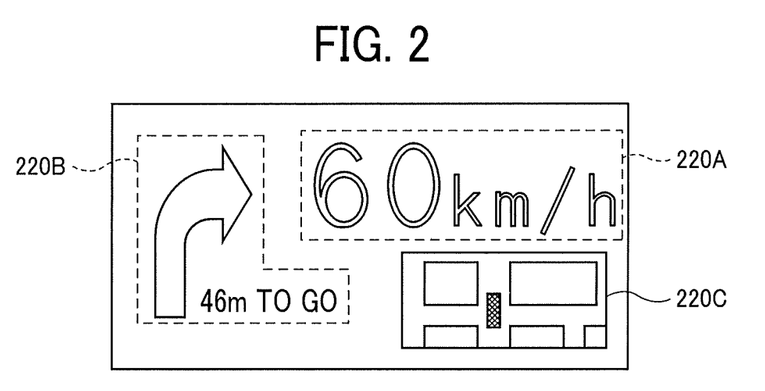
FIG. 2 is a schematic view schematically illustrating an image displayed by the automobile HUD.

An automobile HUD 200 is installed in a dashboard of an automobile 301, for example. Projection light L (scanning light $L_2$ to be described later) that is image light emitted from the automobile HUD 200 in the dashboard is reflected by a windshield 302 serving as a to-be-scanned surface to be directed to an observer (a driver 300), who is a user. The driver 300 can thus visually recognize, for example, a navigation image as illustrated in FIG. 2 as a virtual image. Alternatively, a combiner may be installed on an inner wall surface of the windshield 302 to allow the user to visually recognize the virtual image by the projection light L reflected by the combiner.

In the navigation image illustrated in FIG. 2, the speed of the automobile 301 (an image "60 km/h" in an example illustrated in FIG. 2) is displayed in a first display area 220A. A navigation image from a car navigation device is displayed in a second display area 220B. In the example illustrated in FIG. 2, a right turn instruction image indicating a direction in which the automobile 301 turns at the next corner and an image "46 m to go" indicating the distance to the next corner are displayed as the navigation image. A map image (an image of a map around an own vehicle) from the car navigation device is displayed in a third display area 220C.

Figure 3:
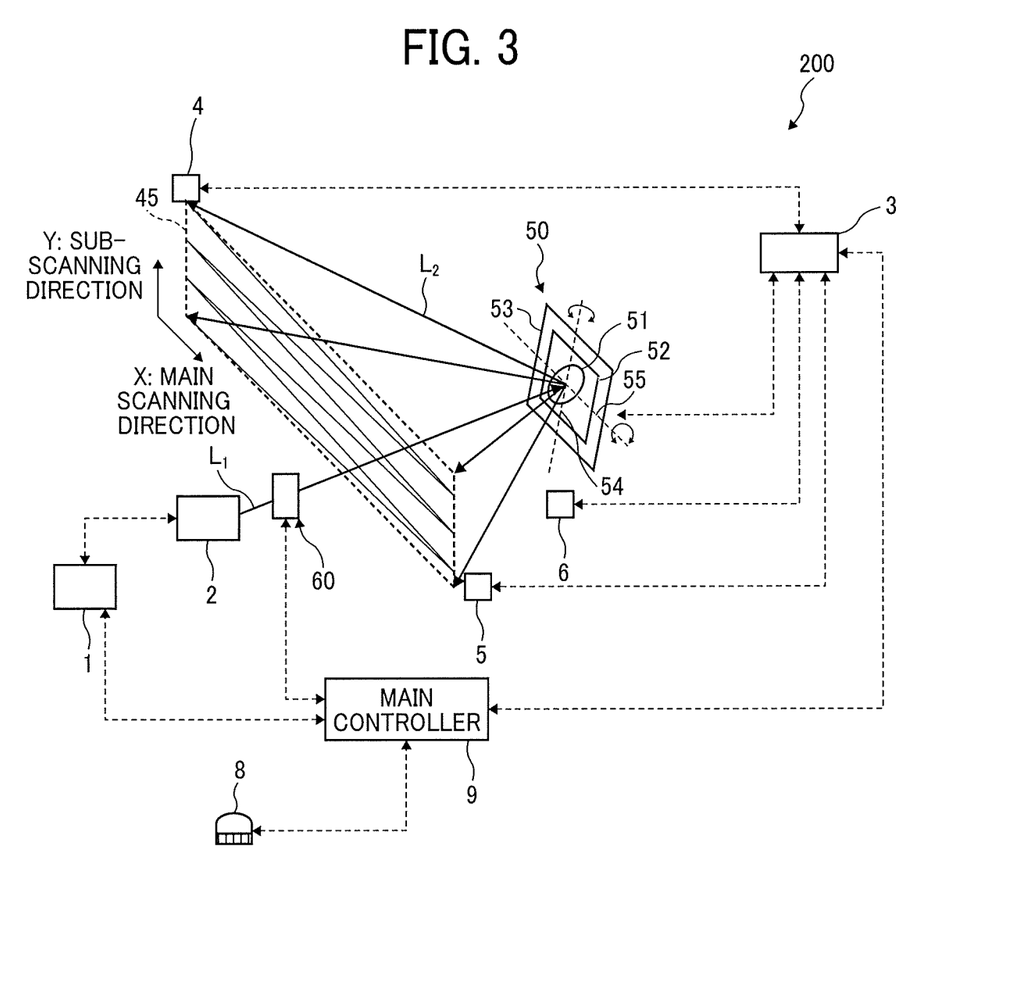
FIG. 3 is a schematic view schematically illustrating an internal configuration of the automobile HUD.

FIG. 3 is a schematic view schematically illustrating an internal configuration of the automobile HUD 200.

All electric signals are indicated by dotted arrows in FIG. 3.

In FIG. 3, a main controller 9 that includes a CPU, a RAM, a ROM, a non-volatile memory, and the like communicates with a light source controller 1 that executes drive control of a light emitting device 2 and a light deflector controller 3 that executes drive control of a light deflector 50 to transmit and receive various information to and from these components. The main controller 9 also communicates with a brightness sensor 8 and controls drive of a light-intensity adjustment device 60.

The brightness sensor 8 detects the brightness of the surrounding environment of the automobile HUD 200, and transmits a result to the main controller 9.

The light source controller 1 controls the intensity, turn-on timing, and waveform of light emitted from the light emitting device 2 and the like. A light beam $L_1$ is emitted from the light emitting device 2 that is controlled by the light source controller 1.

Figure 4:
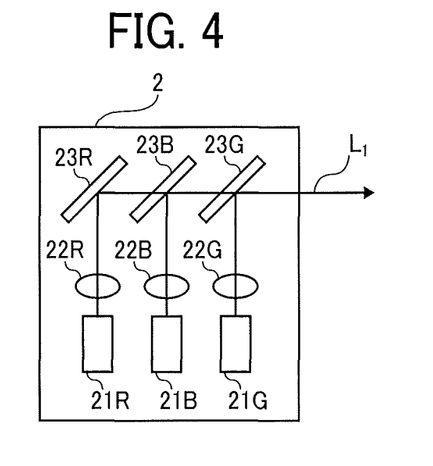
FIG. 4 is an internal configuration view of a light emitting device of the automobile HUD.

FIG. 4 is an internal configuration view of the light emitting device 2.

The light emitting device 2 includes, as a light source, a light source 21R that emits R (red) light, a light source 21B that emits B (blue) light, and a light source 21G that emits G (green) light. These light sources are constituted by laser diodes. The laser diode is a so-called edge emitting laser and is a type of semiconductor laser. It should be noted that alphabetical characters R, B, and G at the end of reference numerals indicate that the components are members for R, B, and G (the same will be applied hereinafter).

In the light emitting device 2, a light source that emits R light having a wavelength of 650 [nm] is used as the R light source 21R. A light source that emits B light having a wavelength of 450 [nm] is used as the B light source 21B. A light source that emits G light having a wavelength of 515 [nm] is used as the G light source 21G.

The light emitting device 2 also includes collimator lenses 22R, 22B, and 22G and dichroic mirrors 23R, 23B, and 23G, in addition to the three light sources described above.

The collimator lenses 22R, 22B, and 22G convert R light, B light, and the G light emitted from the light sources 21R, 21B, and 21G into substantially parallel light.

Each of the dichroic mirrors 23R, 23B, and 23G is made of, for example, a thin film such as a dielectric multilayer film, and reflects light of a specific wavelength and transmits light of other wavelengths.

The dichroic mirror 23R reflects R light transmitted through the collimator lens 22R to the dichroic mirror 23B.

The dichroic mirror 23B transmits R light reflected from the dichroic mirror 23R to the dichroic mirror 23G. The dichroic mirror 23B also reflects B light transmitted through the collimator lens 22B to the dichroic mirror 23G. R light reflected from the dichroic mirror 23R and B light transmitted through the collimator lens 22B enter near the center of the dichroic mirror 23B.

The dichroic mirror 23G transmits R light and B light transmitted through the dichroic mirror 23B in an emission direction of light from the light emitting device 2, and at the same time, reflects G light transmitted through the collimator lens 22G in the same emission direction. R light and B light transmitted through the dichroic mirror 23B and G light reflected from the collimator lens 22G enter near the center of the dichroic mirror 23G.

R light having passed through the dichroic mirror 23R, B light, and G light are combined into one light beam $L_1$. At this time, the color of the combined light is variously represented by balancing the light emission intensity of the light sources 21R, 21B, and 21G.

In FIG. 3, the light beam $L_1$ emitted from the light emitting device 2 passes through the light-intensity adjustment device 60 and the light-intensity of the light beam $L_1$ is adjusted by the light-intensity adjustment device 60. The light beam $L_1$ is then reflected by a reflecting surface of a light reflecting part 51 of the light deflector 50. While a single MEMS mirror that two-dimensionally vibrates or drive-rotates is used as the light deflector 50, a plurality of one-dimensional driven mirrors may be combined to perform two-dimensional scanning.

The light reflecting part 51 of the light deflector 50 is held by a first frame member 52, and the first frame member 52 is held by a second frame member 53. A rotatable first torsion bar 54 extending in a sub-scanning direction (Y) is attached to the first frame member 52. A rotatable second torsion bar 55 extending in a main scanning direction is attached to the second frame member 53.

When the first torsion bar 54 rotates about the axial center of the sub-scanning direction (Y), the light reflecting part 51 is swung around the axial center together with the first frame member 52. By this swing operation, a beam spot of the scanning light $L_2$ is moved on a to-be-scanned surface in the main scanning direction (X). When the second torsion bar 55 rotates about the axial center of the main scanning direction (X), the light reflecting part 51 is swung around the axial center together with the first frame member 52 and the second frame member 53. By this swing operation, the beam spot of the scanning light $L_2$ is moved on the to-be-scanned surface in the sub-scanning direction (Y). Drive of the light deflector 50 that performs such optical scanning is controlled by the light deflector controller 3.

The scanning light $L_2$ deflected by the light deflector 50 is emitted from an emission area 45 to outside of the device and scans a to-be-scanned surface (the windshield 302) outside the device in the main scanning direction (X) and the sub-scanning direction (Y). As the emission area 45 is present within the device, the emission area 45 is not the to-be-scanned surface. However, it seems in FIG. 3 that the emission area 45 is optically scanned, for easy understanding. In practice, the to-be-scanned surface to be optically scanned is the windshield 302 that is present outside the device.

In the main scanning direction, high-speed scanning is performed at a high frequency of approximately 20 through 40 [kHz]. In the sub-scanning direction, high-speed scanning is performed at a low frequency of approximately several tens Hz.

The light deflector 50 deflects light so as to cause a first light receiving part 4 and a second light receiving part 5 outside the emission area 45 to receive light at a predetermined timing. The first light receiving part 4 and the second light receiving part 5 transmit a light receiving signal to the light deflector controller 3 at a timing of receiving light.

Deflection characteristics of the light deflector 50 vary depending on environment and the like. For this reason, in optical scanning, light deflected by the light deflector 50 is actually detected and based on a detection timing, the swing angle of a mirror, the light emission timing of each light source, and the like are corrected and a scanning position and an image size are adjusted. The scanning position of the scanning light $L_2$ in an outward direction thus matches the scanning position of the scanning light $L_2$ in a return direction.

The first light receiving part 4 and the second light receiving part 5 are used for actually detecting light deflected by the light deflector 50.

The light deflector 50 is highly sensitive to temperature in the main scanning direction (X) of resonantly driving the light deflector 50, and thus it is necessary to precisely adjust a scanning position. The light deflector 50 also has temperature characteristics in the sub-scanning direction (Y), and thus it is necessary to adjust the scanning position for the purpose of obtaining high image quality.

The light deflector controller 3 predicts a characteristic change of the light deflector 50 based on a temperature detection result of a temperature detector 6 disposed near the light deflector 50. Based on light receiving signals from the first light receiving part 4 and the second light receiving part 5 and temperature information from the temperature detector 6, the light deflector controller 3 sets an input signal to the light deflector 50.

Figure 5:
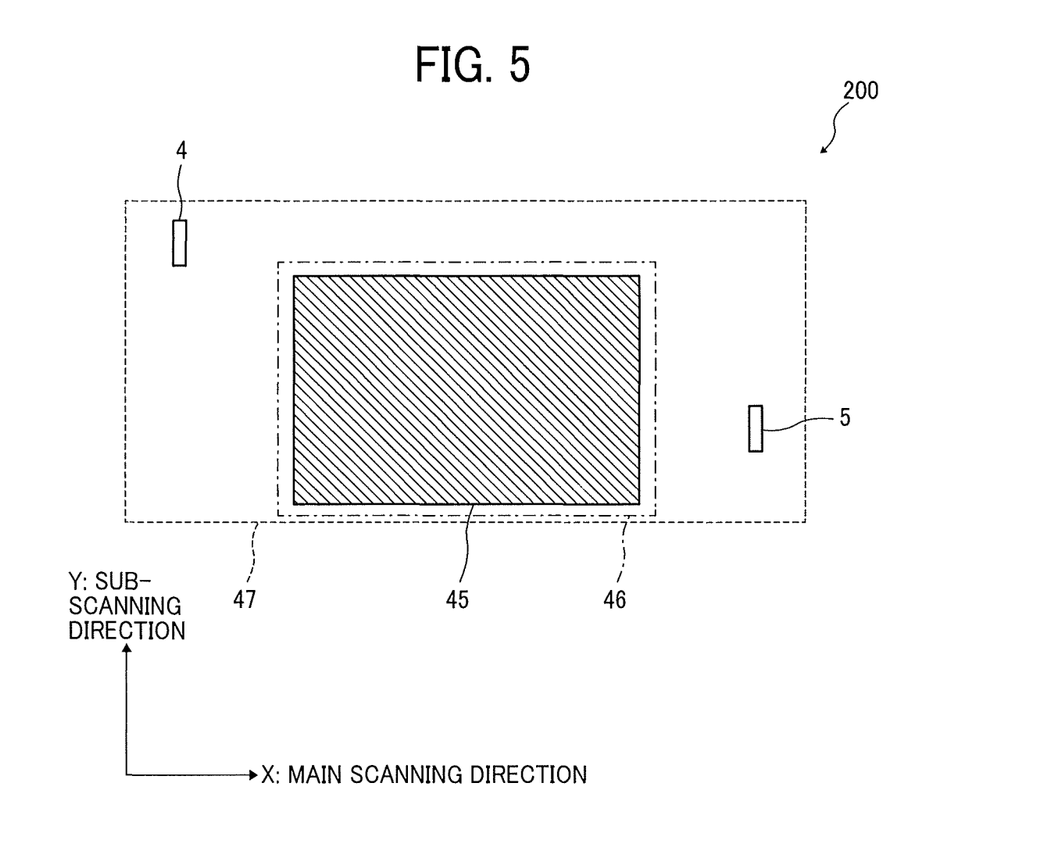
FIG. 5 is a schematic view explaining relative positions of areas in the automobile HUD and light detectors.

FIG. 5 is a schematic view explaining relative positions of each area in the automobile HUD 200 and each light detector (4, 5).

In FIG. 5, a deflection area 47 indicates an area where light deflected by the light deflector 50 reaches.

The emission area 45 is an area where the scanning light $L_2$ generated for displaying an image passes through a light emission part 46 of the automobile HUD 200 when being emitted outside the device. While the emission area 45 is rectangular in this example, the emission area does not need to be rectangular. To downsize the device, the emission area 45 may be minimized according to a figure to be displayed.

As illustrated in FIG. 5, the first light receiving part 4 and the second light receiving part 5 are disposed outside the light emission part 46 and inside the deflection area 47. The light deflector controller 3 turns on one of the R, G, and B light sources (21R, 21G, and 21B) at a timing when the direction of light deflected by the light deflector 50 deviates from the emission area 45 and is close to the first light receiving part 4 and the second light receiving part 5. The first light receiving part 4 and the second light receiving part 5 thus reliably receive light. Hereinafter, light emitted from the light source that is turned on to be received by the first light receiving part 4 and the second light receiving part 5 to receive is referred to as signal light.

The light deflector controller 3 calculates the scanning speed in the main scanning direction (X) and the scanning speed in the sub-scanning direction (Y) based on the following time. That is, the time is the time from when a light receiving signal is transmitted from the first light receiving part 4 to when a light receiving signal is transmitted from the second light receiving part 5, or the time from a light receiving signal is transmitted from the second light receiving part 5 to when a light receiving signal is transmitted from the first light receiving part 4.

In FIG. 3, the light-intensity of scanning light is adjusted by the light-intensity adjustment device 60 during optical scanning. However, when a light source abnormally emits light due to failures of the light source (21R, 21B, or 21G) and the light source controller 1 at the time of startup, a user may be dazzled.

Next, a characteristic configuration of the optical scanning device according to the embodiment and the like will be described.

Figure 6:
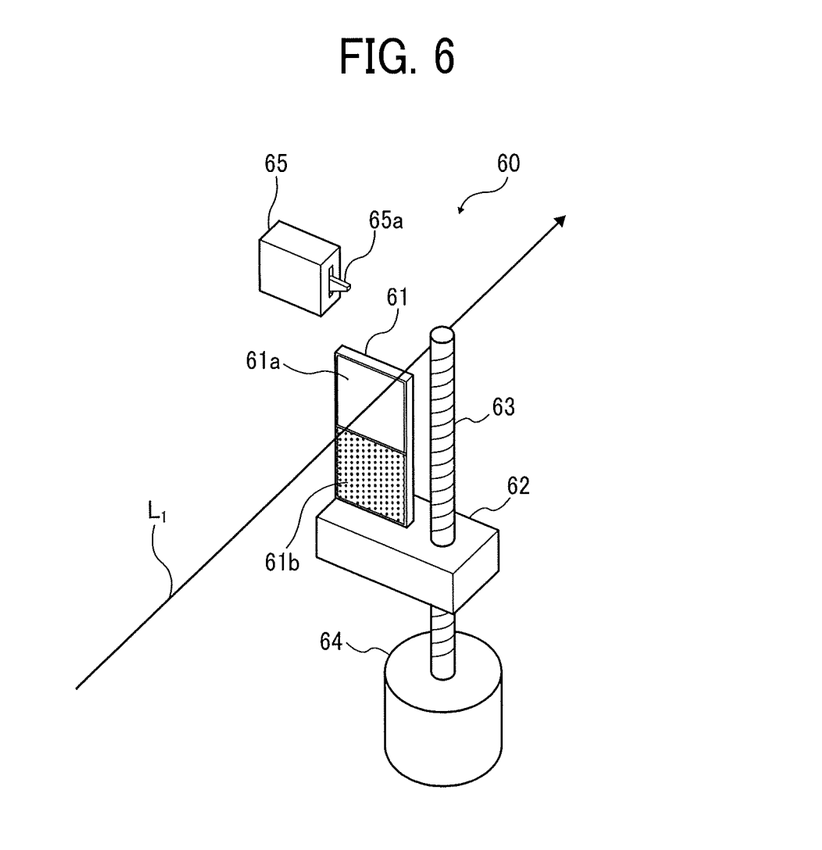
FIG. 6 is a perspective view illustrating main parts of a light-intensity adjustment device of the automobile HUD.

FIG. 6 is a perspective view illustrating main parts of the light-intensity adjustment device 60.

The light-intensity adjustment device 60 includes a light quantity adjuster 61, a holding member 62, a feed screw 63, a screw motor 64 constituted by a stepping motor, a home position (hereinafter referred to as HP) sensor 65, and the like.

The light quantity adjuster 61 includes a first optical attenuator 61a and a second optical attenuator 61b having a light transmittance lower than the first optical attenuator 61a. FIG. 6 illustrates the light quantity adjuster 61 in which the first optical attenuator 61a is placed on an optical path.

A female screw is formed in the holding member 62 that holds the light quantity adjuster 61, and the feed screw 63 is threaded into the female screw. The feed screw 63 is fixed to a motor shaft of the screw motor 64 so as to rotate integrally with the motor shaft.

Figure 7:
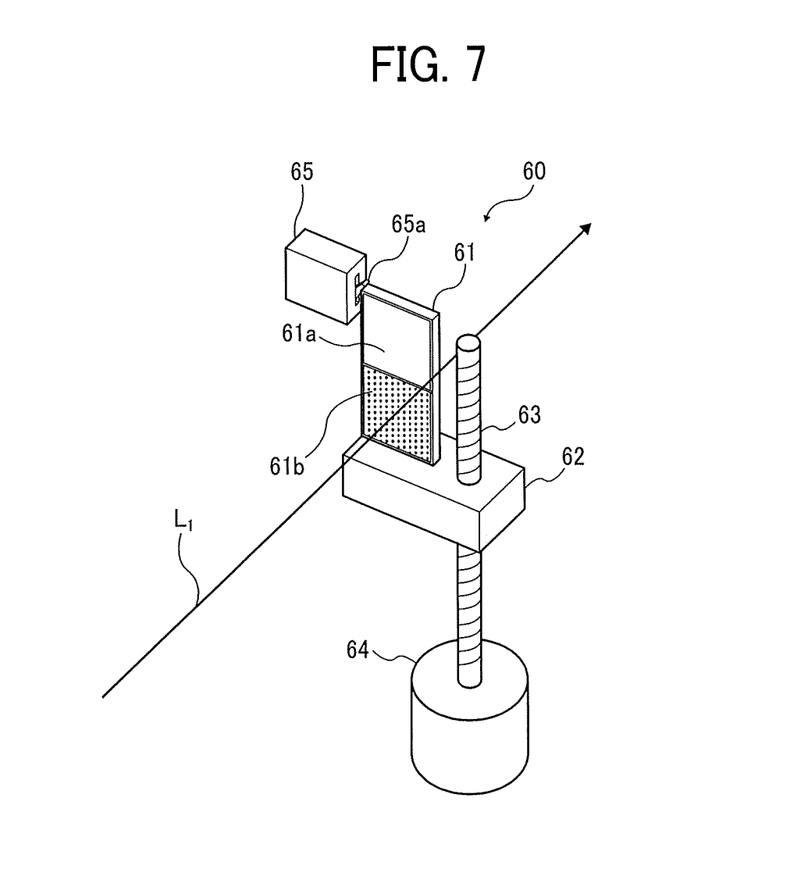
FIG. 7 is a perspective view illustrating the main parts of the light-intensity adjustment device in a state where a light quantity adjuster is moved to a HP.

As the screw motor 64 is driven to rotate forward or reverse, the feed screw 63 moves up and down the light quantity adjuster 61 together with the holding member 62. Consequently, the light quantity adjuster 61 is moved to the position where the first optical attenuator 61a is placed on the optical path as illustrated in FIG. 6, or to the position where the second optical attenuator 61b is placed on the optical path as illustrated in FIG. 7. By switching the optical attenuator to be placed on the optical path between the first optical attenuator 61a and the second optical attenuator 61b, the light-intensity of the light beam $L_1$ after passing through the light quantity adjuster 61 is changed.

The light-intensity adjustment device 60 adjusts the light-intensity to a significant degree. Fine light-intensity adjustment is performed by adjusting the light emission amount of the light sources (21R, 21B, and 21G).

The position of the light quantity adjuster 61 in which the second optical attenuator 61b is placed on the optical path is the HP of the light quantity adjuster 61. As illustrated in FIG. 7, the light quantity adjuster 61, which is in the HP, pushes up a detection member 65a of the HP sensor 65. The HP sensor 65 thus detects that the light quantity adjuster 61 is in the HP that is a predetermined position, and outputs a detection signal to the main controller (9 in FIG. 3).

Figure 8:
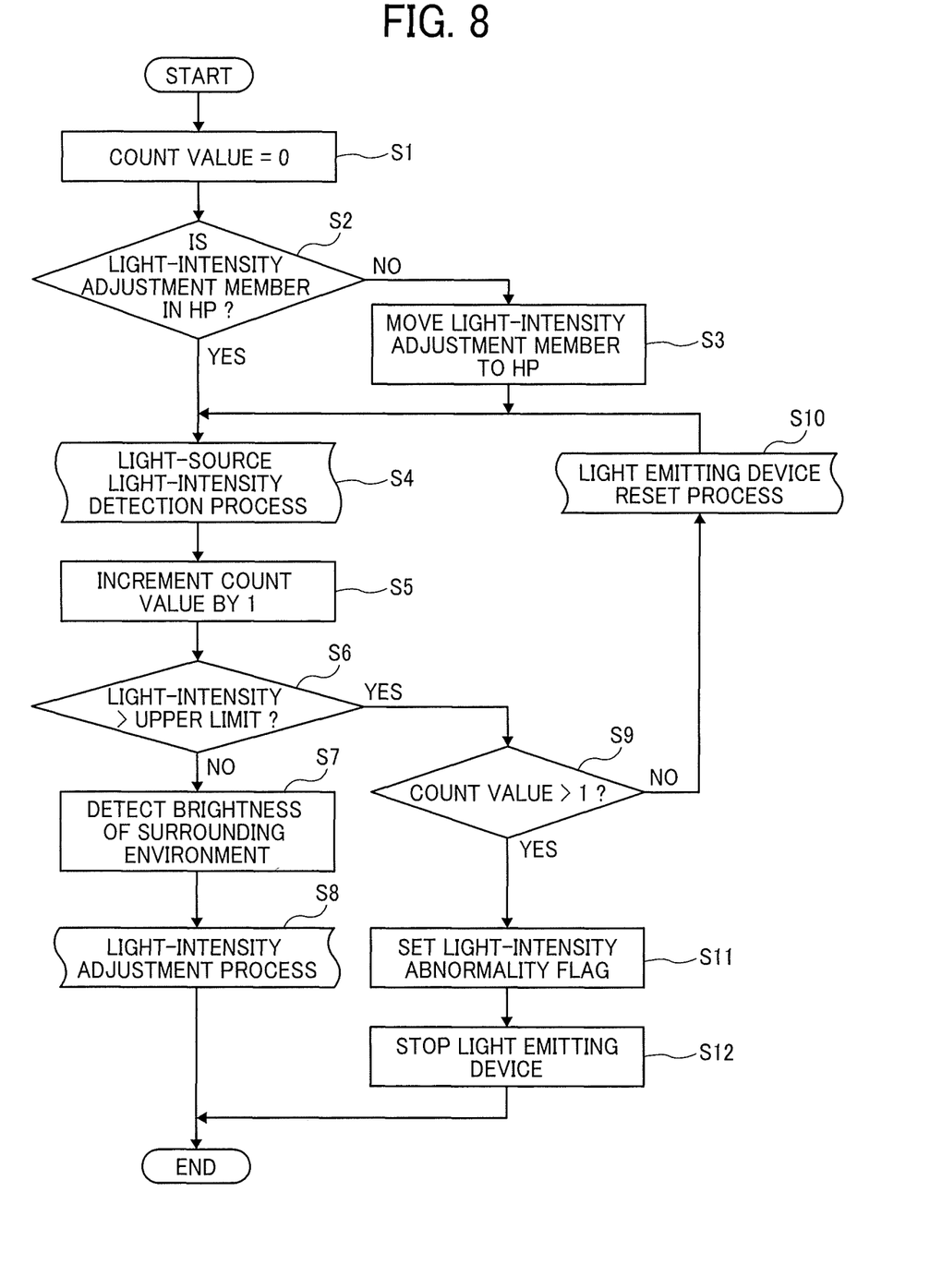
FIG. 8 is a flowchart of a flow of a startup routine process performed by a main controller of the automobile HUD.

FIG. 8 is a flowchart of a flow of a startup routine process performed by the main controller 9.

When power is supplied to the automobile HUD 200, the startup routine process is performed first. When HUD display setting is ON, power starts to be supplied when an ignition is turned on by an engine key. When the ignition is ON and the HUD display setting is OFF, power starts to be supplied when the HUD display setting is turned ON.

When the startup routine process starts, the main controller 9 firstly sets a count value to zero (step 1: hereinafter, step is referred to as "S"), and then determines whether a detection signal from the HP sensor 65 is present, that is, whether the light quantity adjuster 61 is in the HP (S2). When the light quantity adjuster 61 is in the HP, the main controller 9 performs a light-source light-intensity detection process (S4) to be described later. When the light quantity adjuster 61 is not in the HP (N at S2), the main controller 9 moves the light quantity adjuster 61 to the HP (S3). Specifically, the screw motor 64 is driven to rotate forward until the detection signal is output from the HP sensor 65. The light-source light-intensity detection process (S4) to be described later is then performed.

The light quantity adjuster 61 is in the HP that is the predetermined position immediately before the light-source light-intensity detection processing (S4) is performed. Consequently, the second optical attenuator 61b having a low light transmittance is present on the optical path and the light sources (21R, 21B, and 21G) do not emit light. As a result, if the light sources (21R, 21B, and 21G) abnormally emit light thereafter due to some failures, a user is less dazzled by light.

When the light-source light-intensity detection process (S4) starts, the main controller 9 transmits a drive start command signal to the light deflector 50, and then a light-intensity-detection light emission command signal to the light source controller 1. When receiving the light-intensity-detection light emission command signal, the light source controller 1 sequentially turns on for a short time the R light source 21R, the B light source 21B, and the G light source 21G at the timing when light is received by the first light receiving part 4. Meanwhile, the main controller 9 specifies the light-intensity of R light, the light-intensity of B light, and the light-intensity of G light based on a signal transmitted from the first light receiving part 4 via the light deflector controller 3.

When the light-intensity detection process ends, the main controller 9 increments the count value by 1 (S5) and determines whether each of the light-intensity of R light, the light-intensity of B light, and the light-intensity of G light exceeds an upper limit value (S6). When all the three light-intensities do not exceed the upper limit value (N at S6), the brightness of the surrounding environment is specified based on an output from the brightness sensor 8 (S7) and then the light-intensity adjustment process (S8) is performed. A series of the process flow is then terminated.

In the light-intensity adjustment process (S8), based on a brightness detection result of the brightness sensor 8 and a light-intensity detection result specified in the light-source light-intensity detection process, the light-intensity of R light, the light-intensity of B light, and the light-intensity of G light are adjusted. In this case, when the first optical attenuator 61a of the light quantity adjuster 61 needs to be placed on the optical path, the screw motor 64 is driven to rotate reverse for the purpose of moving the light quantity adjuster 61 from the HP. When it is necessary to finely adjust the light emission amount of the light source 21R, 21B, or 21G, fine adjustment is performed.

After receiving a detection signal from the HP sensor 65 after startup, the main controller 9 counts the cumulative forward rotation number and the cumulative reverse rotation number of the screw motor 64 until the power is turned off. By adding the cumulative forward rotation number to the cumulative reverse rotation number, the current position of the light quantity adjuster 61 is specified.

When the light-intensity exceeds the upper limit at step S6 described above, the main controller 9 determines whether the count value is larger than 1 (S9). When the count value is not larger than 1, it means that the first light-intensity detection result after startup exceeds the upper limit. In this case, the main controller 9 performs a light emitting device reset process (S10) and then performs the light-source light-intensity detection process (S4) again.

In the light emitting device reset process (S10), power supply to the light emitting device 2 is stopped temporarily and then restarted.

When the light-intensity still exceeds the upper limit after the light emitting device reset process (S10) is performed, the count value is larger than 1 (Y at S9) in the determination process at S9. In this case, there is a possibility that an abnormality occurs, and thus the main controller 9 sets a light-intensity abnormality flag (S11), then stops the light emitting device 2 (S12), and terminates the series of the process flow.

In setting the light-intensity abnormality flag, the main controller 9 gives the highest priority to an interruption process of notifying the user of an error. It is thus possible to inform the user of the abnormality and prompt the user to perform maintenance inspection.

Next, examples in which more characteristic configurations are added to the automobile HUD 200 according to the embodiment will be described. Configurations of the automobile HUD 200 according to the examples are the same as that of the embodiment unless otherwise noted below.

First Example

Figure 9:
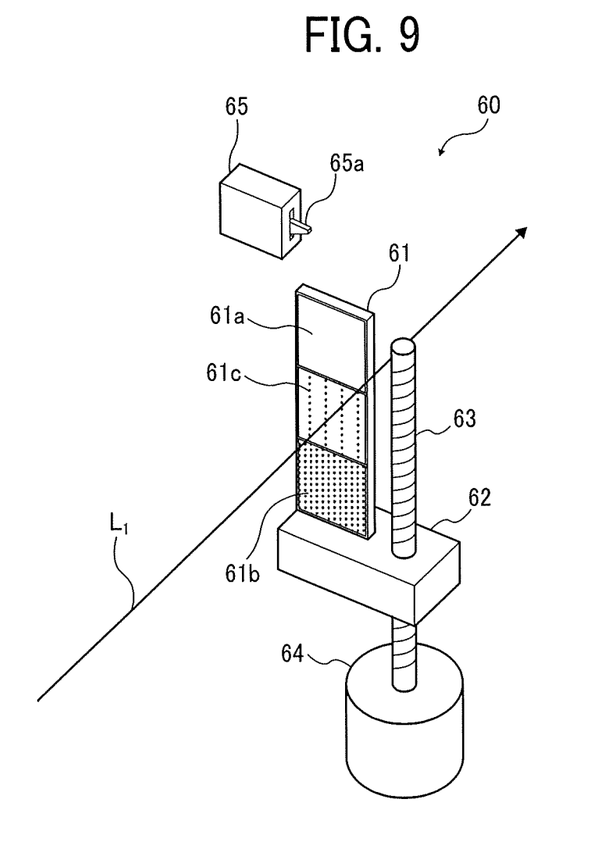
FIG. 9 is a perspective view illustrating main parts of a light-intensity adjustment device of an automobile HUD according to a first example.

FIG. 9 is a perspective view illustrating main parts of the light-intensity adjustment device 60 of the automobile HUD 200 according to a first example.

The light-intensity adjustment device 60 includes not only the first optical attenuator 61a having the highest light transmittance and the second optical attenuator 61b having the lowest light transmittance but also a third optical attenuator 61c having an intermediate light transmittance between the first optical attenuator 61a and the second optical attenuator 61b. Only the first optical attenuator 61a and the third optical attenuator 61c are used for light-intensity adjustment during optical scanning. The second optical attenuator 61b is only used to be placed on an optical path at the time of startup.

With such a configuration, it is possible to prevent the HP sensor 65 from being degraded by repeatedly moving the second optical attenuator 61b to the HP for light-intensity adjustment during optical scanning and repeatedly turning on and off the detection member 65a of the HP sensor 65.

A light quantity adjuster with a gradation in which boundaries between a plurality of optical attenuators are not clear and a light transmittance gradually changes may be used as the light quantity adjuster 61.

When the second optical attenuator 61b serving as a predetermined optical attenuator is only used to be placed on the optical path at the time of startup as in the first example, the second optical attenuator 61b may be a light shielding part instead of a light transmission part.

Second Example

Figure 10:
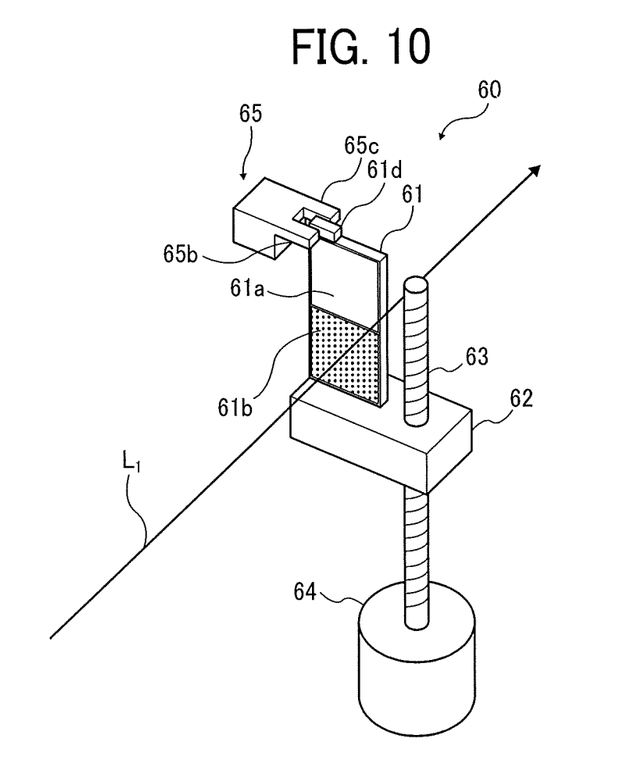
FIG. 10 is a perspective view illustrating main parts of a light-intensity adjustment device of an automobile HUD according to a second example.

FIG. 10 is a perspective view illustrating main parts of the light-intensity adjustment device 60 of the automobile HUD 200 according to a second example.

The light-intensity adjustment device 60 includes, as the HP sensor 65, a transmissive optical sensor that optically detects a specific part of the light quantity adjuster 61, unlike the HP sensor 65 of the embodiment that mechanically detects the specific part of the light quantity adjuster 61. In the HP sensor 65, a light emitting element of a light emitting part 65b opposes a light receiving element of a light receiving part 65c with a predetermined gap therebetween. When the light quantity adjuster 61 is not placed in the HP, light emitted from the light emitting element reaches the light receiving element and is received by the light receiving element. On the other hand, when the light quantity adjuster 61 is moved to the HP, a detection target 61d of the light quantity adjuster 61 enters the gap between the light emitting element and the light receiving element to block light to the light receiving element. It is thus detected that the light quantity adjuster 61 is moved to the HP.

It is desirable to apply the present disclosure not only to the automobile HUD 200 but also to a common display or projector, because abnormal light emission of the light source (21R, 21B, or 21G) at the time of startup may cause trouble for a user.

The above description is only an example and specific effects are achieved for each of the following modes.

First Aspect

According to a first aspect, there is provided an optical scanning device that includes a light source (for example, the light sources 21R, 21B, and 21C) and a light quantity adjuster (for example, the light quantity adjuster 61) that changes a light-intensity of scanning light by switching, among a plurality of optical attenuators having different light transmittances (for example, the optical attenuators 61a, 61b, and 61c), an optical attenuator to be placed on an optical path by movement of the light quantity adjuster, and that optically scans a to-be-scanned surface (for example, the windshield 302) using light from the light source through the light quantity adjuster. The optical scanning device includes a detector (for example, the HP sensor 65) configured to detect that the light quantity adjuster is present at a predetermined position (for example, the HP). At a time of startup, based on a detection result of the detector, a predetermined optical attenuator that does not have a maximum transmittance (for example, the second optical attenuator 61b) among the optical attenuators is placed on the optical path and then the light source starts to emit light.

In the first aspect, when the light source emits light after startup, the predetermined optical attenuator of the light quantity adjuster that does not have the maximum transmittance is placed on the optical path. If the light source abnormally emits light, most of the light-intensity is reduced by the predetermined optical attenuator, and only the remaining small amount of light reaches a user. The user is thus less dazzled by light. As a result, it is possible to avoid a temporary reduction in the user's field of view due to abnormal light emission of the light source at the time of startup.

Second Aspect

According to a second aspect, in the first aspect, the predetermined optical attenuator is the optical attenuator having a minimum transmittance among the optical attenuators.

In the second aspect, it is possible to prevent a user from being dazzled by abnormal light emission of the light source at the time of startup.

Third Aspect

According to a third aspect, in the first or second aspect, the predetermined position is a position where the predetermined optical attenuator is placed on the optical path.

In the third aspect, at a time point when the detector detects that the light quantity adjuster is present at the predetermined position, the predetermined optical attenuator is placed on the optical path. Consequently, it is not necessary to move the predetermined optical attenuator on the optical path and thus the light source can emit light immediately. As a result, it is possible to reduce the time from startup to light emission of the light source.

In addition, in the third aspect, after the detector detects that the light quantity adjuster is present at the predetermined position, the light quantity adjuster does not need to be moved so that the predetermined optical attenuator is placed on the optical path. It is thus possible to prevent a user from being dazzled by abnormal light emission of the light source caused by a optical attenuator different from the predetermined optical attenuator being placed on the optical path because of operational failures.

Fourth Aspect

According to a fourth aspect, in the first, second, or third aspect, a light-intensity of the light source is adjusted based on a detection result of the detector at a time of startup and an amount of movement of the light quantity adjuster after the detection result is obtained.

In the fourth aspect, it is possible to omit an operation of moving the light quantity adjuster to the predetermined position and then to a desired position whenever the light quantity adjuster is moved for light-intensity adjustment, so that the efficiency of a light-intensity adjustment operation can be improved.

Fifth Aspect

According to a fifth aspect, in the fourth aspect, the predetermined position is outside a range in which the light quantity adjuster is moved for adjusting a light-intensity during optical scanning.

In the fifth aspect, it is possible to prevent the detector from being degraded by repeatedly moving the predetermined optical attenuator to the predetermined position for light-intensity adjustment during optical scanning and repeatedly turning on and off the detector.

Sixth Aspect

According to a sixth aspect, in an image display device (for example, the automobile HUD 200) that optically scans a to-be-scanned surface by an optical scanning device to display an image on the to-be-scanned surface, the first, second, third, fourth, or fifth aspect is used as the optical scanning device.

Seventh Aspect

According to a seventh aspect, in a heads-up display (for example, the automobile HUD 200) that optically scans a to-be-scanned surface by an optical scanning device to display an image on the to-be-scanned surface, the first, second, third, fourth, or fifth aspect is used as the optical scanning device.

Eighth Aspect

According to an eighth aspect, in a mobile object (for example, the automobile 301) in which an image display device or a heads-up display is incorporated, the sixth aspect is used as the image display device or the seventh aspect is used as the heads-up display.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An optical scanning device, comprising:
    a light source configured to emit scanning light;
    a light quantity adjuster including a plurality of optical attenuators having different light transmittances, the light quantity adjuster configured to change a light-intensity of the scanning light by switching one of the plurality of optical attenuators placed on an optical path, by movement of the light quantity adjuster, to scan a to-be-scanned surface using the scanning light passed through the light quantity adjuster; and
    a home position sensor configured to detect a presence of a predetermined optical attenuator of the plurality of optical attenuators at a predetermined position, wherein
    a switch is pushed on and turned off by movement of the light quantity adjuster,
    the switch is turned on in a case that the home position sensor detects that the predetermined optical attenuator is present at the predetermined position,
    the switch is turned off in a case that the home position sensor detects that the predetermined optical attenuator is not present at the predetermined position, and
    the light source starts emitting the scanning light after one of the plurality of optical attenuators is placed on the optical path at a time of startup.

2. The optical scanning device according to claim 1, wherein the one of the plurality of optical attenuators, having a transmittance lower than the maximum transmittance of the another one of the plurality of optical attenuators, has a minimum transmittance among the plurality of optical attenuators.

3. The optical scanning device according to claim 1, wherein the light source starts emitting the scanning light after one of the plurality of optical attenuators, having a transmittance lower than a maximum transmittance of another one of the plurality of optical attenuators, is placed on the optical path at a time of startup based on a detection result of the home position sensor.

4. The optical scanning device according to claim 1, wherein the home position sensor detects a position of the plurality of optical attenuators.

5. The optical scanning device according to claim 1, wherein the home position sensor detects one of the plurality of optical attenuators is placed on the optical path in a case that the light quantity adjuster is present at the predetermined position.

6. The optical scanning device according to claim 4, wherein the home position detector detects the position of the plurality of optical attenuators at a point outside a range in which the plurality of optical attenuators are arranged.

7. The optical scanning device according to claim 1, wherein a light-intensity of the light source is adjusted based on a detection result of the home position sensor at the time of startup and an amount of movement of the light quantity adjuster after the detection result is obtained.

8. An image display device, comprising:
    the optical scanning device according to claim 1, wherein
    the optical scanning device optically scans a to-be-scanned surface to display an image on the to-be-scanned surface.

9. A heads-up display, comprising:
    the optical scanning device according to claim 1, wherein
    the optical scanning device optically scans a to-be-scanned surface to display an image on the to-be-scanned surface.

10. A mobile object comprising:
    the image display device according to claim 8.

11. A mobile object comprising:
    the heads-up display according to claim 9.

12. The optical scanning device according to claim 1, further comprising:
    a screw motor; and
    a feed screw mounted to the light quantity adjuster, wherein
    the movement of the light quantity adjuster is performed by the screw motor rotating the feed screw.

13. The optical scanning device according to claim 1, wherein
    the plurality of optical attenuators are oriented along an axis, and
    the movement of the light quantity adjuster is performed along the axis.

14. The optical scanning device according to claim 1, further comprising:
    a brightness sensor that detects a brightness of an environment surrounding the optical scanning device.

15. The optical scanning device according to claim 14, further comprising:
    a motor; and
    processing circuitry, wherein
    the movement of the light quantity adjuster is performed by the motor, and
    the processing circuitry controls the motor to move the light quantity adjuster based on the brightness detected by the brightness sensor.

16. The optical scanning device according to claim 15, wherein
    the motor is a screw motor, and
    the optical scanning device further comprises a feed screw mounted to the light quantity adjuster, wherein
    the movement of the light quantity adjuster is performed by the screw motor rotating the feed screw.

* * * * *